United States Patent [19]
Brown

[11] Patent Number: 5,944,259
[45] Date of Patent: Aug. 31, 1999

[54] SPRAY GUN WITH IMPROVED SEAL

[75] Inventor: Daniel P. Brown, Palos Park, Ill.

[73] Assignee: Flexible Products Company, Marietta, Ga.

[21] Appl. No.: 08/906,749

[22] Filed: Aug. 6, 1997

[51] Int. Cl.⁶ .............................. F23D 11/46; B05B 7/12; B05B 7/02
[52] U.S. Cl. ...................... 239/414; 239/417.5; 239/526; 239/527; 251/309
[58] Field of Search ..................................... 239/413, 414, 239/416.1, 417.5, 526, 527; 251/148, 309, 314; 222/516; 169/15

[56] References Cited

U.S. PATENT DOCUMENTS

| | | |
|---|---|---|
| 2,373,925 | 4/1945 | Townhill . |
| 3,111,299 | 11/1963 | Miller et al. . |
| 3,182,952 | 5/1965 | Montesi .................................. 251/148 |
| 3,405,908 | 10/1968 | Scaramucci ............................. 251/148 |
| 3,512,944 | 5/1970 | Craig et al. . |
| 3,704,704 | 12/1972 | Gonzales . |
| 3,889,923 | 6/1975 | Saville et al. . |
| 4,925,107 | 5/1990 | Brown ..................................... 239/414 |
| 5,305,988 | 4/1994 | Cox ........................................ 251/309 |
| 5,529,245 | 6/1996 | Brown ............................. 239/416.1 X |

*Primary Examiner*—Andres Kashnikow
*Assistant Examiner*—Steven J. Ganey
*Attorney, Agent, or Firm*—Vedder, Price, Kaufman & Kammholz; James T. Fitzgibbon

[57] ABSTRACT

A spool valve and cooperating housing with a particular shape. A portion of the housing has a relatively thin sidewall and it includes an integrally formed stub cylindrical wall portion. A cooperating cylindrical force-applying element is present which deforms the thin wall portion into snug sealing contact with the portion of the valve spool lying adjacent thereto.

9 Claims, 2 Drawing Sheets

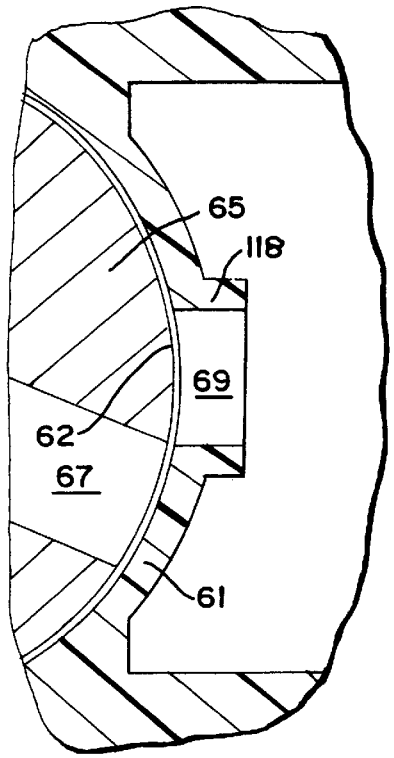
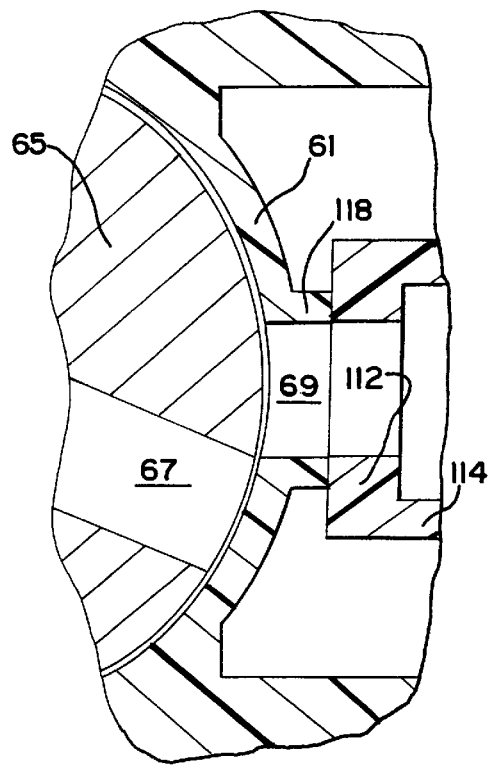
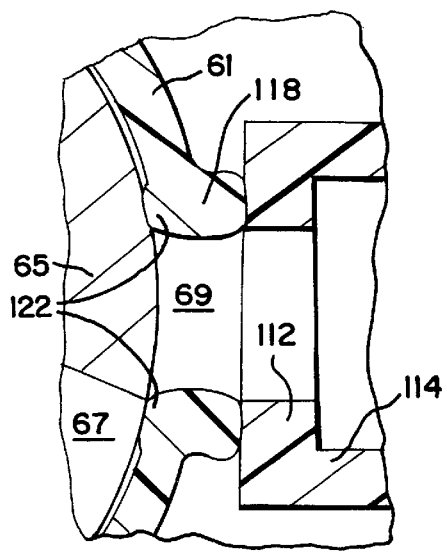
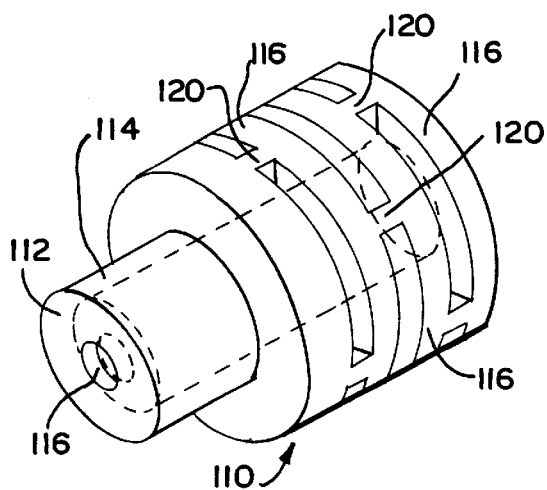

SPRAY GUN WITH IMPROVED SEAL

BACKGROUND OF THE INVENTION

The present invention relates generally to mixing and dispensing guns for use in the plastic foam industry, and more particularly, to a design of gun which is adapted for easy, low cost mass production manufacture and which is capable of performing the functions needed for precise mixing and dispensing of thermosetting chemical products resulting from the mixture of two reactive chemical components. Most particularly, the invention relates to a novel form of seal which is used and which is particularly effective in sealing a spool valve and the surrounding areas.

In recent years, there has been an ever increasing use of polyurethane and like plastic foams for a number of applications. Urethane and related products, including isocyanurates, silicones, phenolics, and epoxies, are well known as having a number of desirable characteristics. These include the potential for excellent heat insulation, compatibility with low cost blowing agents, reproducability of chemical characteristics and excellent chemical and physical properties in the finished product.

Many urethane foams are resistant to degradation by common solvents, moisture and atmospheric oxidation. Urethanes provide the best combination of heat insulation and physical strength for a given cost. The foam is a naturally adhesive material and bonds well to any number of substrates. In this connection, it can add structural strength to many article wherein such strength is an important element. Fire retardance may be achieved easily with available formulations.

Moreover, urethane foams, being the reaction product of two individual components, may be varied in chemical composition for a number of purposes. Thus, urethane foams may be formulated so as to provide a finished product which is quite rigid, which is semi-rigid, or which is somewhat flexible and/or elastomeric. Foams of the kind in question may be made with almost exclusively closed cells, or with a desired proportion of open cells.

The types of products with which the instant invention is concerned are primarily the closed cell foam types of product used for insulation purposes in building structures and open the celled product used for packaging applications. The components of the foam are passed at high pressures above 40–50 p.s.i. through a gun which serves to meter and mix the components thoroughly in a nozzle from which they are discharged. According to the invention, chemicals components are taken directly to a job site in pre-pressurized cylinders. The amount of product required to be dispensed is not so large as to require permanent, expensive equipment, as would be the case in a factory.

However, the amount of product used is significantly larger than could be accommodated by using small, individual aerosol cans, for example. The individual containers of the components carry from several pounds up to perhaps 25 to 50 or even more pounds or more of each component. These tanks are sufficiently portable to be moved about on the job site by one worker, but yet are able to provide sufficient foam to provide several hundred or even thousand board feet of coverage.

With the ability of the chemical supply tanks to be moved about, there has been a significant demand for a dispensing gun which would provide the advantages and characteristics of low cost, operating flexibility and reliability in use, and provide an excellent seal between the spool and the body of the gun.

One of these required characteristics is that the product be able to be mixed in a nozzle which can be used and then disposed of after use, and replaced with another nozzle at low cost for a succeeding job or succeeding phase of the job then being undertaken.

Another desirable characteristic is that the chemical products or constituents be able to be metered accurately and proportioned both as between themselves, and as a whole considering the desired dispensing rate.

A still further requirement of a gun of the type in question is that the valving be constructed and arranged so as to permit a proper proportioning action to be maintained even when the trigger is held completely opened or is opened within an intermediate range of positions to vary the discharge rate as desired.

An ideal gun, consequently, would be one which is able to be reliably manufactured at low cost and which will prevent premixing of the components, keeping them isolated from each other until they are discharged into the mixing chamber of an associated nozzle.

Another desirable characteristic of such a gun would be the ability to position a discharge nozzle correctly by "feel" and make it possible for the operator to insure himself that the nozzle is fully seated in a locked position before the gun is likely to be used.

Yet another desirable characteristic would be a gun having the porting designed so as not to have any dead space for the accumulation of the chemicals in the port where they may be exposed to the atmosphere. Specifically, where the isocyanate component of the polyurethane would be allowed to have contact with atmospheric moisture (humidity) and react and crystallize in the port, rendering the gun inoperable.

Accordingly, it is an object of the present invention to provide a gun which includes components which are easy to manufacture at low cost, incorporating a minimum number of components designed for mass production with no subcomponent assembly or remanufacture.

Another object of the invention is to provide a gun which includes a valve assembly adapted to insure that the components are not mixed with each other prior to their discharge into the mixing chamber of the associated nozzle.

Yet another object of the invention is to provide a valve arrangement which is adapted to promote mixing of the desired proportions of components at a variety of trigger or discharge rate settings.

Still another object of the invention is to provide a gun which is compatible with existing mixing and dispensing nozzles which are associated with the gun in use.

A further object of the invention is to provide a novel seal arrangement between the gun body and the spool valve.

A still further object of the invention is to provide a novel resilient arrangement to maintain sealing pressure on the area of the nozzle of the gun body wherein the seal is taking place.

An additional object of the invention is to provide an inlet passage for the gun wherein the nozzle end of the hose is equipped with a fitting which, by reason of being seated in the correct position, inherently insures that a correct amount of force is brought to bear on the sealing surface.

Another object of the invention is to provide a valve component seating arrangement which will allow for seating of the valve at high, low, and intermediate pressures.

Yet another object of the invention is to provide a combination load applying and slightly resilient member which may be used in the application sealing force.

The present invention achieves the foregoing and other objects and advantages of the invention by providing a gun body which includes a spool valve, an inlet and an outlet therefor, a slightly deflectable but unitary wall, and a combination load applying and wall deflecting component urged into position by the hose and having a set screw thereon, the combination being operative to apply a sufficient load to slightly deflect the wall of the housing surrounding the spool valve only in the area of compression by the wall deflecting component.

The manner in which these objects and advantages are achieved in practice will become more clearly apparent when taken in connection with a detailed description of the preferred embodiments of the invention set forth by way of example and shown in the accompanying drawings, in which like reference numbers indicate the corresponding parts throughout.

BRIEF DESCRIPTION OF THE DRAWINGS

FIG. 3 is a further enlarged view showing the flexible wall of the gun body of the invention, and with the spool in the "off" position and the force-applying unit absent;

FIG. 4 is a view similar to FIG. 3, and showing the force-applying component in position but not under load; and FIG. 5 is a view showing the wall surrounding the opening being deflected into position by the force-applying component.

FIG. 6 is a perspective view of the force-applying unit.

DESCRIPTION OF THE PREFERRED EMBODIMENTS OF THE INVENTION

While the advantages of the invention may be achieved and practiced by the use of other structures, a preferred embodiment of the invention is of the type shown, wherein the gun assembly is made principally from plastic material and includes the various structural and functional features to be described here in detail.

Figure 1:
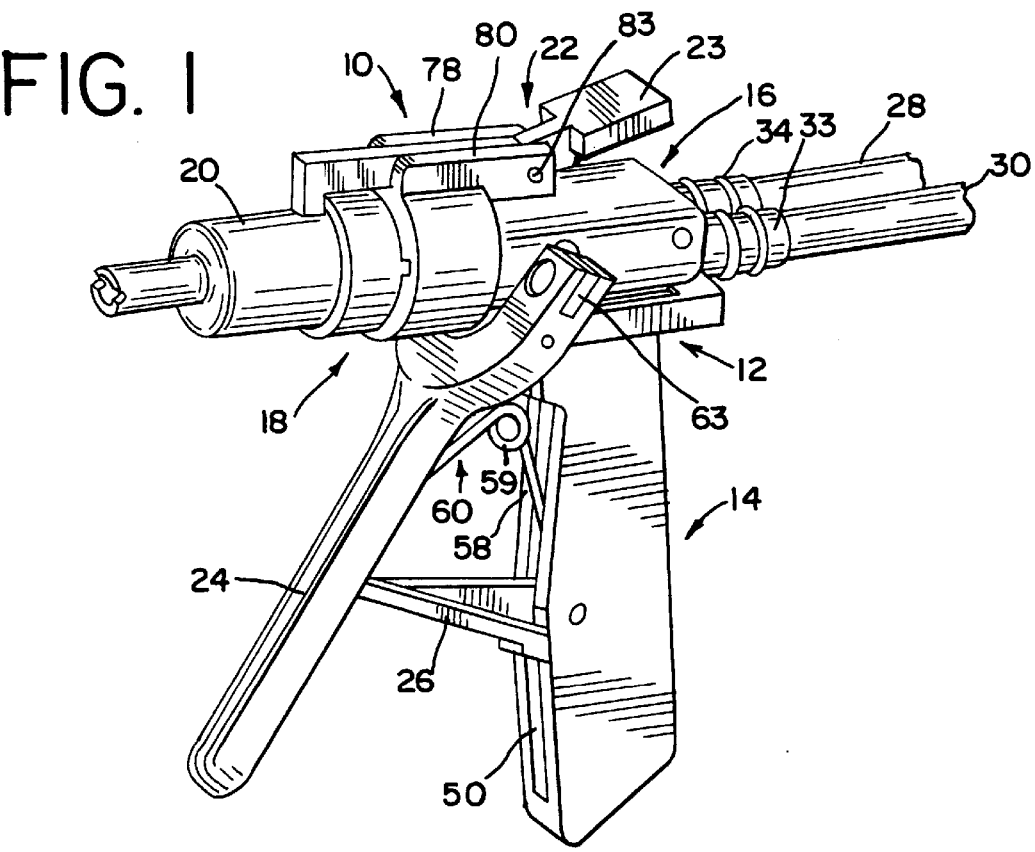
FIG. 1 is a perspective view of the mixing and dispensing gun assembly of the invention, showing the same in a typical position of use with the mixing and dispensing nozzle in place in the gun and with the trigger in the closed position and the trigger safety engaged.

Referring now to FIG. 1, a gun assembly generally designated 10 is shown to include a number of principal components, including a gun body generally designated 12 and shown to be subdivided into a handle generally designated 14, a component passage and gun body flow control valve housing 16, a nozzle receiver assembly 18, a removable nozzle 20, a combination nozzle latch and ejector element 22, a trigger assembly 24, a trigger safety 26, and first and second component inlet hoses 28, 30, each terminating in forward fittings 31, 33.

Figure 2:
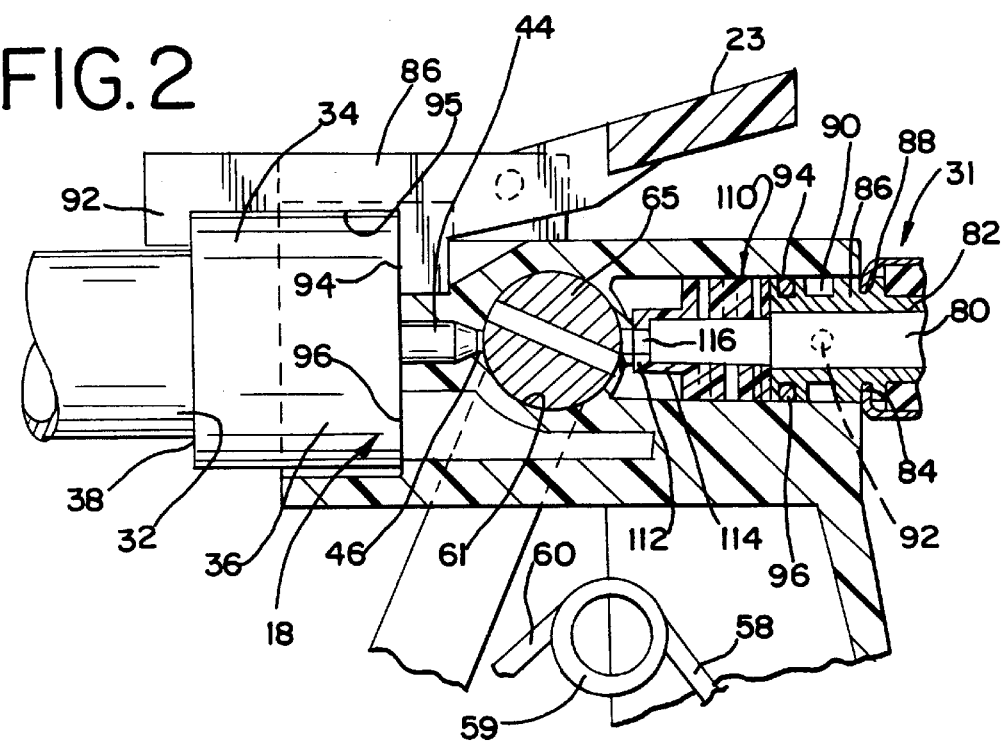
FIG. 2 is a vertical sectional view of the gun of FIG. 1, showing the trigger in the off position with the trigger safety engaged.

Referring now to FIG. 2, it is shown that the nozzle assembly generally designated 20 includes a cylindrical, reduced diameter main mixing body portion 32, an enlarged diameter seating body portion 34 having a cylindrical exterior registration and alignment surface 36, which includes a forwardly directed, radially extending annular latch-engaging surface 38. At its axially inner (toward the gun body) end portions a pair of nipples 44 (only one shown for clarity) are provided, each of which is adapted to seat within outlet passages 46 in the gun body.

The gun body 12 includes the handle 14 just referred to and this part, in turn, includes a vertically extending slot 50 adapted to receive a part of the trigger safety 26 when the safety is in a folded position. The slot 50 also provides a convenient receptacle for one leg 58 of a trigger return spring generally designated 60 and shown to be of the "clothespin" or hairpin type, operating in response to torsional forces generated in its center coil 59.

The upper portion of the gun body 12 includes as a major element, a product flow control valve housing 16 having the components referred to in detail elsewhere herein, and also shown to include spool receiving means in the form of generally circular sidewalls 61 defining a cylindrical bore or passage 62 extending transversely to the principal axis of the housing 16. The trigger operates ears 63 on the spool 65, bringing the central spool passage 67 into and out of alignment with the product flow passages 46, 69.

Surmounting the housing 16 is a combination nozzle latch and ejector element receiver generally designated 22 and shown to include generally parallel or slightly tapering spaced apart sidewalls 78, 80 designed to snugly engage the ejector when it is in the locked position, and each of which includes an identical small opening 83 for receiving the pivot ears (not shown) forming a part of the nozzle latching and ejector element 22.

This unit 22 in turn is shown to comprise a rockerstyle lever assembly having a finger tab 23 lying to one side of the pivot ears and a generally horizontal latching leg 86. The end portion of the latching leg terminates in a claw 92, while the front face 94 of an ejector leg acts to engage the rear face of the nozzle, for expulsion thereof in the raised position. The latch and ejector receiver has its sidewalls 78, 80 spaced closely enough apart such that these walls snugly engages the leg 86 of the latching and ejector element 22, preventing it from moving too freely and helping retain the nozzle 20 in place.

The nozzle receiver assembly 18 is disposed at the forward end of the housing 16 and includes a radially inwardly facing cylindrical nozzle guide surface 95 terminating at its inner end in a front wall portion 96.

Referring now to the inlet passage 81 and the nipple generally designated 31, it will be seen that the insert portion 82 of the hose is crimped by a metal portion 84 into a groove 88 in a fitting generally designated 86. Another groove 90 is provided to receive a set screw 93. Finally, the fitting 86 includes a forwardmost groove 94 for accommodating an 0-ring 96.

The composite fitting 86 bears on a force-applying element generally designated 110 and shown to include a radial flange 112 and an axial flange 114 defining an open passage 116 for product. As FIG. 6 shows, the remainder or axially outer end of the force-applying element 110 includes several discs 117 that extend completely around the circumference of the fitting, and alternately, with spacers 120 that are placed circumferentially apart on the discs 117. In other words, the first disc 117 is connected to the second by spacers 120 disposed at 2, 6 and 10 o'clock, with the second being connected by spacers 120 at 12, 4 and 8 o'clock. The third disc is connected to the fourth by spacers 120 at 2, 6 and 10 o'clock. The result of this arrangement is that the overall fitting 110 has a spring constant that is high, but not excessive.

When the fitting exerts the force on the seat, the seat deflects in a regular pattern. Thus, and referring to FIG. 3, with the clearances exaggerated for clarity, a greatly enlarged version of the spool 65, the sidewall 61, and the passages 67, 69. The wall 61 also includes an extension 118 in the form of a stub cylinder. As shown in FIG. 4, when the force-applying element 110 is placed in the application, the radial flange 112 and the axial flange 114 are ready to bear upon the stub cylinder 118 but have not done so. At this point, again with clearances greatly exaggerated for clarity, there is a very small clearance space between the wall 61 and the spool 65, and particularly, the opening 67 in the spool. However, as force is applied, as shown in FIG. 5, the radial flange 112 and the axial flange 114 of the force-applying element in effect, deflect the cylinder 118, and its imaginary extension, so that portions thereof 122 adjacent the spool valve deflect into contact with the spool valve, and other portions adjacent the radial flange 112 deflect somewhat both radially inwardly and outwardly. A detail of the deformation, and the extent to which it takes place, is shown somewhat schematically in FIG. 5.

In the alternative, in place of the unit 110, a plurality of Belleville washers (not shown) could be arranged in front-to-back relation. Other spring arrangements with a relatively high constant could be used. The arrangement shown is illustrative but not exhaustive.

In this position, in effect, a virtual O-ring is created about the sealed area. However, the advantage of this arrangement is that the bulge or deflection of the sidewall is only in an area about the stub cylinder, which is difficult to seal. The shape of the arrangement with the cylinder pushing on the spool, in effect, creates dimension such that the cylindrical surface of the sealing ring is completely sealed without loss of effectiveness.

Otherwise, an O-ring would require a seat of a somewhat cylindrical configuration. In the alternative, it would be necessary to force the sidewall into a more snug engagement with the spool. In the way of the invention, a very effective seal is created, yet a great deal of force is not necessary to overcome the resistance of the seal.

Having the arrangement of the present invention has other advantages. Cold flow of the plastic parts under load will be accommodated as necessary. The cumulative variation in tolerances inherent in manufacturing all multi-component plastic assemblies will thus be accommodated by the rings, which act as springs. In addition, this arrangement compensates for wear quite easily. If there is wear due to relaxation of the parts, or otherwise, the spring will exert a relatively constant force that will accommodate these variations also.

In use, the gun is operated like any other. The unit is attached to the hose of chemicals (not shown) and it is ready to operate. A new nozzle is placed in the gun, and it may be used with interruptions of up to two or three minutes. When a longer time between shots is desired, the thumb button 23 is pressed and the used nozzle is ejected. A new nozzle is then replaced in the opposite sequence, and the gun is ready to operate again. The seal is not affected, and will function as long as the gun does.

The gun may operate with two hoses, as shown, or it may involve an auxiliary hose and a somewhat modified nozzle for use with a third component. This usually comprises a gas stream, but it may be a third liquid component, a catalyst, or otherwise. The seal has proven highly effective in any case.

It will thus be seen that the present invention provides a novel seal, including one having the characteristics pointed out and others which are inherent in the invention. It is anticipated that modifications and variations to the invention will occur to those skilled in the art and it is anticipated that such modifications and changes may be made to the described form of the invention without departing from the spirit of the invention, or the scope of the appended claims.

I claim:

1. In combination, a spool valve and a housing shaped to accommodate the spool valve, a product passage in said spool valve, an outlet passage and an inlet passage in said housing, a portion of said housing being a relatively thin sidewall and, integrally formed in inner margin portions of said thin sidewall thereof, a stub cylindrical wall portion, and a cylindrical force-applying element of congruent shape aligned with respect to said stub cylinder, whereby, in use, when said force-applying element acts on said stub cylinder, said inner margin portions of said thin sidewall aligned with said stub cylinder are forced into snug sealing contact with a portion of said spool valve lying adjacent thereto, thereby, preventing leakage into a space between said thin sidewall and said spool valve.

2. A combination as defined in claim 1, wherein said spool valve includes two product passage openings, and in which said relatively thin sidewall and stub cylindrical wall portion comprises two such portions.

3. A combination as defined in claim 1, wherein said cylindrical force-applying element is made from a plastic material.

4. A combination as defined in claim 1, wherein said cylindrical force-applying element includes discs alternating with spacers therefor, said spacers being disposed in different locations relative to different portions of said discs.

5. A combination as defined in claim 1, wherein said cylindrical force-applying element includes a disc, spacers disposed at 12, 4 and 8 o'clock, another disc and spacers disposed at 2, 6 and 10 o'clock, and at least one other disc.

6. In a foam gun having a spool valve received in a housing, the improvement comprising said housing including a thin sidewall surrounding at least a portion of the spool valve, a stub cylinder formed integrally with the thin sidewall, said sidewall having portions aligned with said stub cylinder, an opening defined by the inside of said stub cylinder, a force-applying fitting also having an open bore therethrough approximately matching said opening in said stub cylinder, said force-applying fitting having at least a radial flange engaging said stub cylinder, and means for applying a compressive force to said stub cylinder through said force-applying fitting in order to distort said portions of said thin sidewall aligned with said stub cylinder into contact with said spool valve to form a seal between said thin sidewall and said spool valve, thereby, preventing leakage into a space between said thin sidewall and said spool valve.

7. In a foam gun as defined in claim 6, said housing including two portions surrounding at least a portion of said spool valve, two stub cylinders formed integrally in said thin sidewall, two openings defined inside said stub cylinders, two force-applying fittings, and two product passages in said spool valve.

8. In a foam gun having a spool valve received in the housing according to claim 6, the improvement comprising said force-applying fitting consisting of a series of interleaved discs and spacers, said spacers being arranged at different positions in respect to said discs.

9. In a foam gun having a spool valve received in the housing according to claim 6, the improvement comprising said force-applying fitting consisting of a series of interleaved discs and spacers, said one set of spacers being located at different radial portions with respect to an adjacent set of spacers.

* * * * *